(No Model.)

C. P. NUTTER.
COUPLING BETWEEN MOVABLE AND FIXED STEAM PIPES.

No. 547,935. Patented Oct. 15, 1895.

Witnesses:
Walter E. Lombard.
C. A. MacClure.

Inventor:
Charles P. Nutter,
by N. C. Lombard
Attorney.

UNITED STATES PATENT OFFICE.

CHARLES P. NUTTER, OF BOSTON, MASSACHUSETTS.

COUPLING BETWEEN MOVABLE AND FIXED STEAM-PIPES.

SPECIFICATION forming part of Letters Patent No. 547,935, dated October 15, 1895.

Application filed August 4, 1893. Serial No. 482,373. (No model.)

*To all whom it may concern:*

Be it known that I, CHARLES P. NUTTER, of Boston, in the county of Suffolk and State of Massachusetts, have invented certain new and useful Improvements in Couplings Between Fixed and Movable Steam-Pipes, of which the following, taken in connection with the accompanying drawings, is a specification.

My invention relates to coupling-joints between fixed and revolving steam-pipes; and it consists in certain novel features of construction, arrangement, and combination of parts, which will be readily understood by reference to the description of the accompanying drawings and to the claims at the end of this specification, in which my invention is clearly pointed out.

Figure 1:
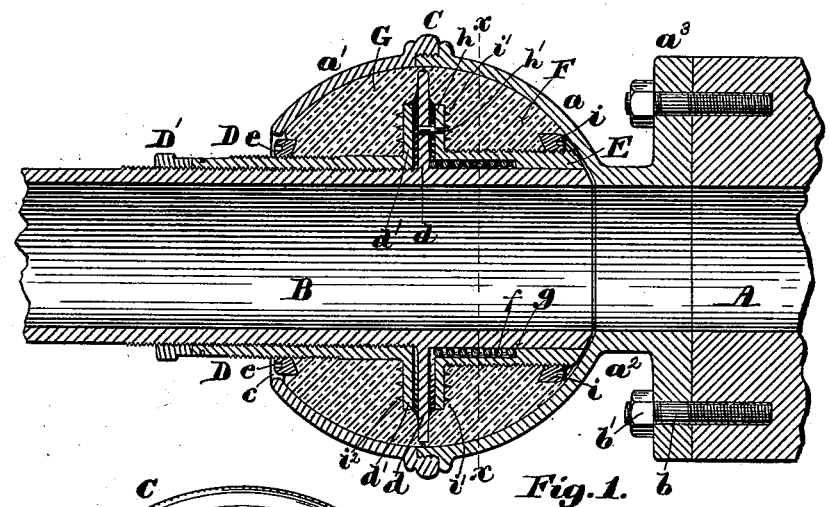
Figure 2:
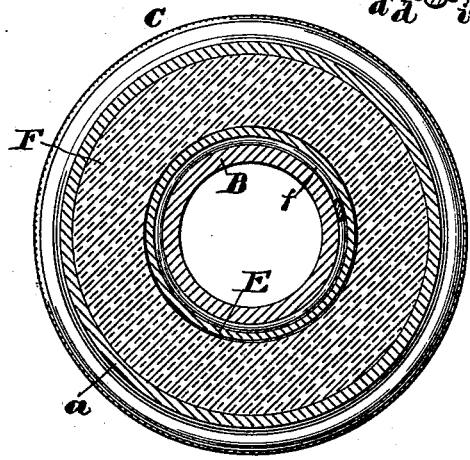
Figure 3:
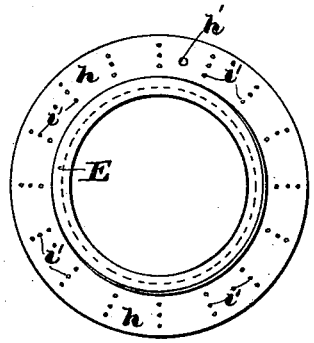
Figure 4:
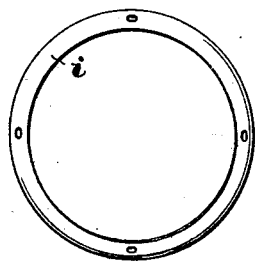

Figure 1 is a longitudinal section through the axes of two connecting-pipes with my improved coupling-joint applied thereto. Fig. 2 is a transverse section through the coupling on line $x\ x$ on Fig. 1, looking toward the left of said figure. Fig. 3 is an end view of the spring-inclosing sleeve, and Fig. 4 is an elevation of one of the ring-clamps.

In the drawings, A is a steam-passage to a revolving pipe, cylinder, or other steam-holding receptacle, (not shown,) and B is a stationary supply-pipe for conducting the steam thereto.

C is a hollow chamber, preferably spheroidal in form, made in two parts $a$ and $a'$, screwed together, as shown. The part $a$ is formed in one piece with the pipe-section $a^2$, having the annular flange $a^3$, by which and the studs $b$ and nuts $b'$ said chamber C is secured to the hub or journal of the steam-holding receptacle, as shown in Fig. 1. The part $a'$ of the chamber C has an opening $c$ through it somewhat larger than the diameter of the pipe B. The pipe B has an annular flange $d$, formed thereon or secured thereto in a fixed position and has a male screw-thread cut thereon outside or to the left of said flange $d$, to which is fitted the internally-threaded sleeve D, having the annular flange $d'$, formed on its inner end and a male screw-thread on its outer end portion, to which is fitted the internally-threaded collar or nut $e$.

E is a sleeve bored out for a portion of its length to fit the inner end portion of the pipe B with a close sliding fit, and the remaining portion of its length bored out to a larger diameter to form an annular chamber between it and said pipe B, in which is placed a spring $f$, with one end abutting against the flange $d$ and at its other end against the shoulder $g$ in the interior of the sleeve E, the tension of which spring tends to force said sleeve E toward the right of Fig. 1. The sleeve E has formed upon the inner end thereof the annular flange $h$, which has set therein the pin $h'$, which projects into a hole in the flange $d$ to prevent the sleeve E revolving about the pipe B when the casing C revolves.

F is a ring, of wood or other suitable fibrous material, clamped to the sleeve E between the flange $h$ and the ring-nut or threaded collar $i$, fitted to an exterior thread on the other end of said sleeve, said ring F being prevented from revolving about said sleeve by the spurs $i'$, projecting from the flange $h$, as shown in Fig. 1.

G is a similar ring, of wood or other fibrous material, clamped between the flange $d'$ and ring nut or collar $e$ and prevented from turning on said sleeve D by the spurs $i^2$, set in the flange $d'$, as shown. The outer surfaces of the rings F and G are made in the form of sections of a sphere to fit the inner surface of the casing C, as shown in Fig. 1. The sleeve D is clamped firmly to the pipe B by the binding-nut D', and may be adjusted thereon by loosening said nut and turning said sleeve, the collar or nut $e$, and the ring G about said pipe, and then tightening said nut again. As the surfaces of contact between casing C and the rings F and G wear, the tension of the spring $f$ will cause the sleeve E to be moved away from the flange $d$, thus taking up the wear and keeping the joint tight. When the spring has expanded a given amount, the sleeve D is adjusted toward the left of Fig. 1 until the spring is compressed again to its original length.

The operation of my invention will be readily understood from the foregoing without further explanation here. By this construction an effective steam-tight joint between a fixed and a movable pipe-section is produced at a comparatively low cost and that will not easily get out of order.

What I claim as new, and desire to secure by Letters Patent of the United States, is—

1. In a steam pipe joint the combination with a stationary pipe section and a movable pipe section, of a hollow metallic casing attached to one of said pipe sections and having a chamber the wall of which is circular in transverse section and curved longitudinally or having a diameter, at the middle of its length, greater than toward its two ends; an outwardly projecting annular flange attached to the other of said pipe sections and inclosed within said casing at or near the middle of its length; and two packing rings mounted upon said last mentioned pipe section one upon each side of said flange and constructed and arranged to conform peripherally to the curved surface of said casing and to be moved away from each other to tightly pack the joint.

2. In a steam pipe joint the combination with stationary and movable pipe sections of a hollow metallic casing attached to one of said pipe-sections; an outwardly projecting annular flange attached to the other of said pipe-sections and inclosed in said metallic casing; a pair of sleeves mounted upon said last mentioned pipe section, one upon each side of said annular flange, so as to be movable toward and from each other and each provided upon its inner end with an annular flange and upon its outer end with an adjustable collar or nut; and a packing-ring clamped upon each of said sleeves and having its outer periphery fitted to the inner surface of said inclosing casing.

3. In a steam pipe joint the combination with stationary and movable pipe-sections of a metallic casing attached to one of said pipe sections; an annular flange attached to the other of said pipe sections and inclosed in said casing; the sleeve D threaded upon said last mentioned pipe and provided upon its inner end with the flange $d'$ and upon its outer end with a male screw thread; the threaded collar or nut $e$ fitted to and movable on the exteriorly threaded portion of said sleeve; the packing ring G clamped to said sleeve; the sleeve E fitted to and movable on the same pipe as the sleeve D but on the opposite side of the flange $d$, and provided on its inner end with the flange $h$, and with an annular chamber; the pin $h'$ engaging a hole in the flange $d$; the collar or nut $i$ fitted to the opposite end of said sleeve; the packing ring F clamped between the flange $h$ and the nut $i$; and the spring $f$ interposed between the flange $d$ and a shoulder of the sleeve E as set forth.

4. In a steam pipe joint the combination with stationary and movable pipe sections of a hollow metallic casing attached to one of said pipe-sections; an annular flange attached to the other of said pipe-sections and inclosed by said casing; a sleeve adjustably secured upon said last mentioned pipe section and provided on its inner end with an annular flange and on its outer end with a threaded collar or nut; and a packing ring clamped to said sleeve between said flange and collar and adapted to fit to the inner surface of said hollow casing to pack the joint.

In testimony whereof I have signed my name to this specification, in the presence of two subscribing witnesses, on this 3d day of August, A. D. 1893.

CHARLES P. NUTTER.

Witnesses:
N. C. LOMBARD,
WALTER E. LOMBARD.